(12) United States Patent
Sylvain

(10) Patent No.: US 7,447,165 B1
(45) Date of Patent: Nov. 4, 2008

(54) ADAPTIVE DIALING

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 777 days.

(21) Appl. No.: 10/824,226

(22) Filed: Apr. 14, 2004

(51) Int. Cl.
*H04L 12/66* (2006.01)
*H04Q 7/20* (2006.01)
*H04Q 7/00* (2006.01)

(52) U.S. Cl. ............... 370/254; 370/329; 370/352; 455/445

(58) Field of Classification Search ......... 370/254–310, 370/352–395, 401–428; 709/227–238; 455/428–445
See application file for complete search history.

(56) References Cited

U.S. PATENT DOCUMENTS

| | | | |
|---|---|---|---|
| 6,104,799 A * | 8/2000 | Jain et al. ............... | 379/211.01 |
| 6,185,565 B1 | 2/2001 | Meubus et al. ................. | 707/10 |
| 6,496,508 B1 * | 12/2002 | Breuckheimer et al. ..... | 370/397 |
| 6,570,868 B1 * | 5/2003 | Cable et al. ................. | 370/351 |
| 6,625,132 B1 * | 9/2003 | Boettger et al. ............. | 370/329 |
| 6,882,862 B1 * | 4/2005 | Chia et al. ................... | 455/555 |
| 6,910,074 B1 * | 6/2005 | Amin et al. ................. | 709/227 |
| 6,940,849 B2 * | 9/2005 | Eichen et al. ............... | 370/352 |
| 6,999,770 B2 * | 2/2006 | Hirsbrunner et al. ........ | 455/445 |
| 7,099,306 B2 * | 8/2006 | Goodman et al. ........... | 370/352 |
| 7,116,681 B1 * | 10/2006 | Hovell et al. ................. | 370/466 |
| 2002/0080822 A1 * | 6/2002 | Brown et al. ................. | 370/475 |
| 2004/0058709 A1 * | 3/2004 | Zabawskyj et al. .......... | 455/560 |
| 2004/0264410 A1 * | 12/2004 | Sagi et al. ................... | 370/331 |
| 2007/0025270 A1 * | 2/2007 | Sylvain ....................... | 370/254 |
| 2007/0025333 A1 * | 2/2007 | Sylvain ....................... | 370/352 |
| 2007/0165607 A1 * | 7/2007 | Mussman et al. ........... | 370/352 |

* cited by examiner

*Primary Examiner*—M. Phan
(74) *Attorney, Agent, or Firm*—Withrow & Terranova, PLLC

(57) ABSTRACT

The present invention allows a telephony terminal, which is capable of communicating over multiple networks, to select an address for initiating communications with a terminating party based on the currently available network connectivity. When different addresses or address formatting is required for different networks, the telephony terminal will automatically determine the appropriate address to use to initiate the communications to the terminating party.

36 Claims, 5 Drawing Sheets

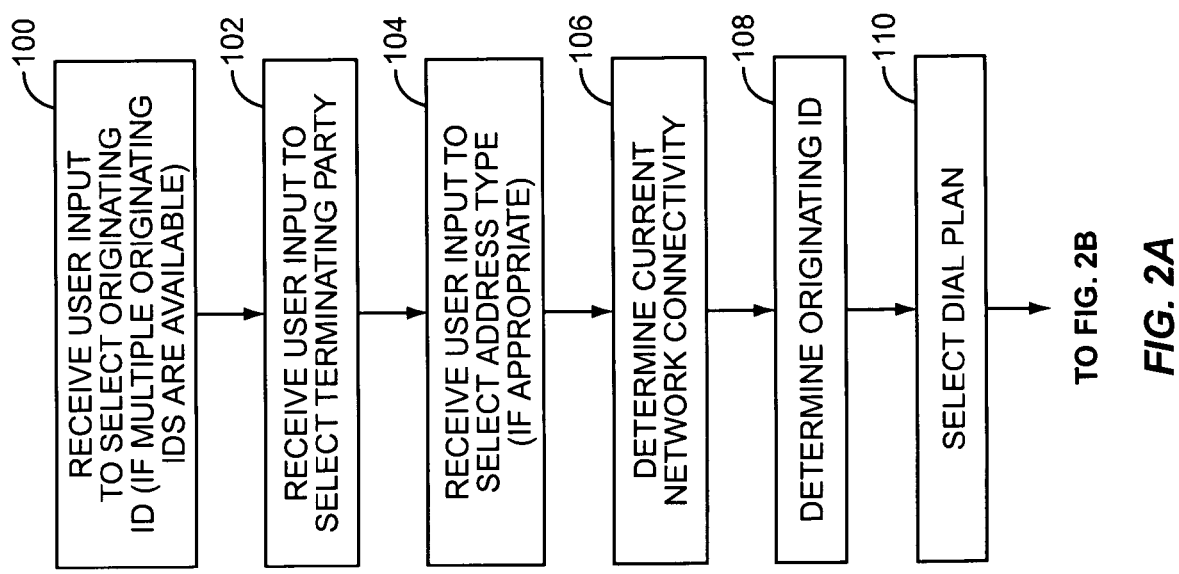

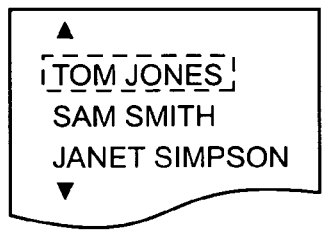
*FIG. 2C*
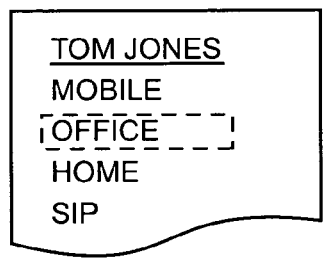
*FIG. 2D*
| BUSINESS ID IS ORIGINATOR | PERSONAL ID IS ORIGINATOR |
|---|---|
| PSTN → PUBLIC DP | PSTN → PUBLIC DP |
| CELLULAR → PUBLIC DP | CELLULAR → PUBLIC DP |
| ENTERPRISE WLAN → ENTERPRISE DP | ENTERPRISE WLAN → PUBLIC DP |
| ENTERPRISE LAN → ENTERPRISE DP | ENTERPRISE LAN → PUBLIC DP |
| HOME WLAN → ENTERPRISE DP | HOME WLAN → PUBLIC DP |
| HOTSPOT WLAN → ENTERPRISE DP | HOTSPOT WLAN → PUBLIC DP |
*FIG. 2E*
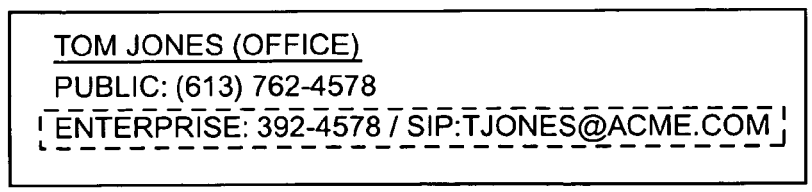
*FIG. 2F*

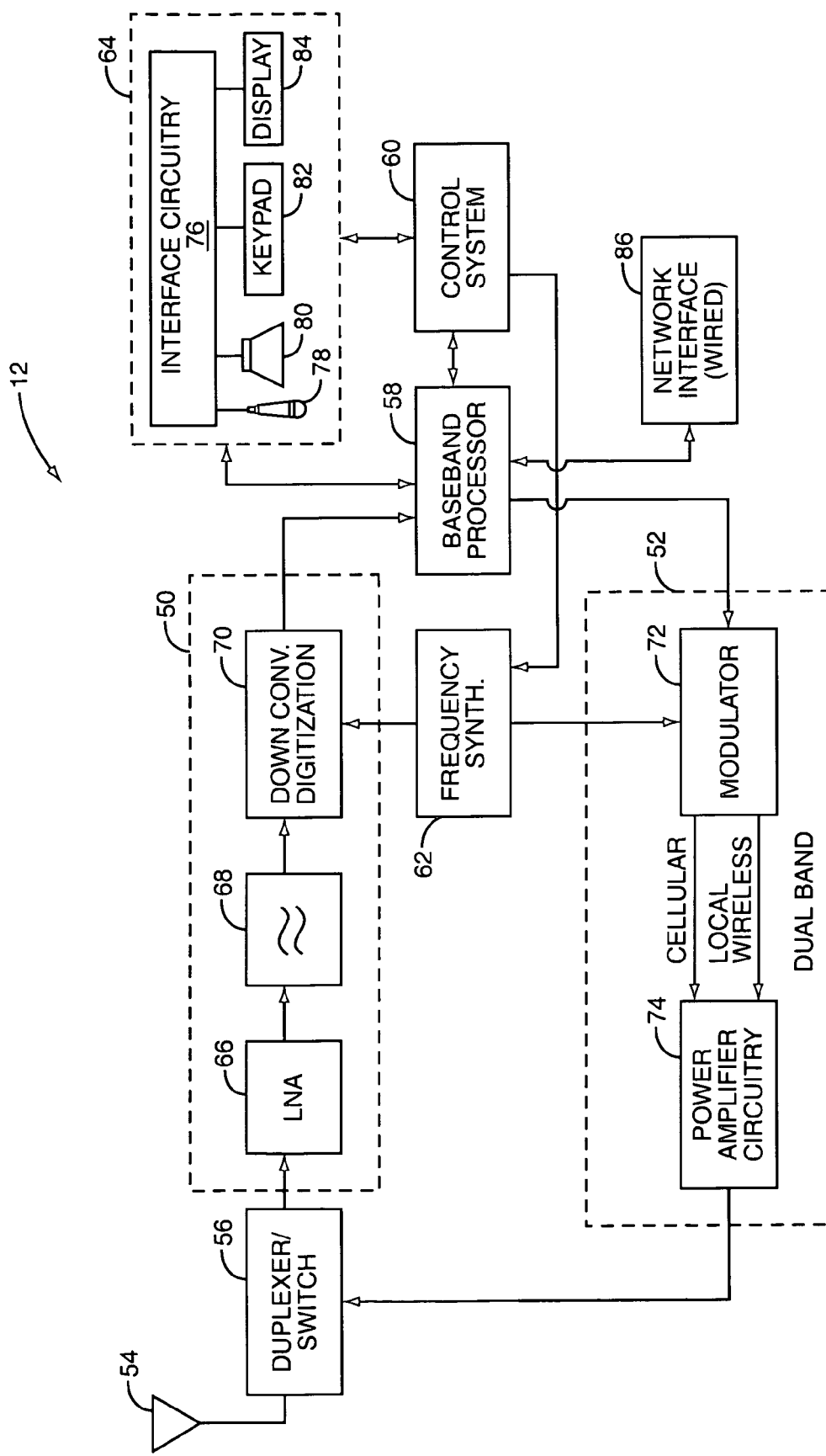

ADAPTIVE DIALING

FIELD OF THE INVENTION

The present invention relates to telephony communications, and in particular to a telephony terminal capable of selecting an appropriate address for initiating a call to a terminating party based on the network supporting the telephony terminal.

BACKGROUND OF THE INVENTION

The network supporting a telephony terminal often dictates the directory number to use for initiating a call to another party, referred to herein as a terminating party. For example, business environments often enable employees to call one another by simply dialing the four-digit extension, without requiring a local prefix to be dialed. For example, if a terminating party's ten-digit directory number is 613-555-1234, fellow employees may simply dial 1234 to reach the terminating party. Alternatively, an alternate prefix or other number to obtain access to a telephony line may need to be dialed. Thus, the calling party may need to dial a 9 followed by the four-digit extension. In larger business environment, the three-digit prefix (555) may be replaced with a location code, such as 12 or 412, wherein calls that would otherwise be long distance are facilitated by simply dialing the internal prefix and the extension, without dialing 1, the area code, the normal prefix, and extension. If the caller is outside of the business environment, the normal directory number must be dialed. Accordingly, different dialing plans are needed to reach the terminating party, depending on from where the originating party is making the call.

Recent advances in personal communications have led to the development of telephony terminals that are capable of communicating over different types of communication networks and using different types of communication technologies to facilitate such communications. For example, multimode telephony terminals may be able to communicate via traditional cellular methods as well as over wired or wireless local area networks. These local area networks may be within a business environment or outside of a business environment. Thus, the addressing required to initiate a call to a terminating party may require yet another variation of a directory number, a completely different directory number, or a particular uniform resource locator (URL), which resembles an email address. As the number of ways in which a telephony terminal can initiate communications increases, the number of dialing plans or addresses associated with the terminating party will increase.

Although telephony terminals are currently configured to store contact information to assist in initiating calls to terminating parties, these telephony terminals are not capable of determining the appropriate dialing plan or address to use for initiating a call to a terminating party in light of the type of network through which the telephony terminal must communicate. Accordingly, there is a need for a telephony terminal that is capable of communicating over multiple networks to automatically determine an appropriate dialing plan or address to use to initiate a new call to a terminating party based on the network currently supporting the telephony terminal.

SUMMARY OF THE INVENTION

The present invention allows a telephony terminal, which is capable of communicating over multiple networks, to select an address for initiating communications with a terminating party based on network connectivity. When different addresses or address formatting is required for different networks, the telephony terminal will automatically determine the appropriate address to use to initiate the communications to the terminating party. In one embodiment, the telephony terminal will have access to a list of available addresses for the terminating party, and will select the appropriate address based on the network connectivity. In another embodiment, the telephony terminal may modify an existing address based on the network connectivity. The modifications may include adding, removing, or substituting a portion of the address, such as adding or removing a prefix to the address. These prefixes may include codes necessary to access resources on the communication network through which the telephony terminal will initiate communications. The addresses may take the form of traditional directory numbers, as well as packet-based network addresses, which may include alphabetic, numeric, and symbolic characters. In yet another embodiment, the telephony terminal may support different types of originating identifications, such as for business and personal use. The address determined by the telephony terminal for initiating communications with the terminating party may also be based on the selected originating identification.

In addition to determining the appropriate address to initiate communications, the telephony terminal may receive various types of input from the user to select the terminating party. The terminating party may be selected by specifying a name entered by the user or selected from an appropriate menu. Further, the terminating party may be selected from a call log stored on or accessible by the telephony terminal. The call logs may include call logs for previously initiated calls as well as received calls.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A and 2B are a flow diagram illustrating operation of an exemplary embodiment of the present invention.

FIG. 2C represents a contact list displayed to a user according to one embodiment of the present invention.

FIG. 2D is a list of communication options for a terminating party provided to the user according to one embodiment of the present invention.

FIG. 2E illustrates exemplary dialing plans associated with different types of network connectivity for both business and personal calls from the user according to one embodiment of the present invention.

FIG. 2F represents a contact list showing multiple addresses associated with a terminating party location according to one embodiment of the present invention.

FIG. 3 is a block representation of a multimode telephony terminal according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
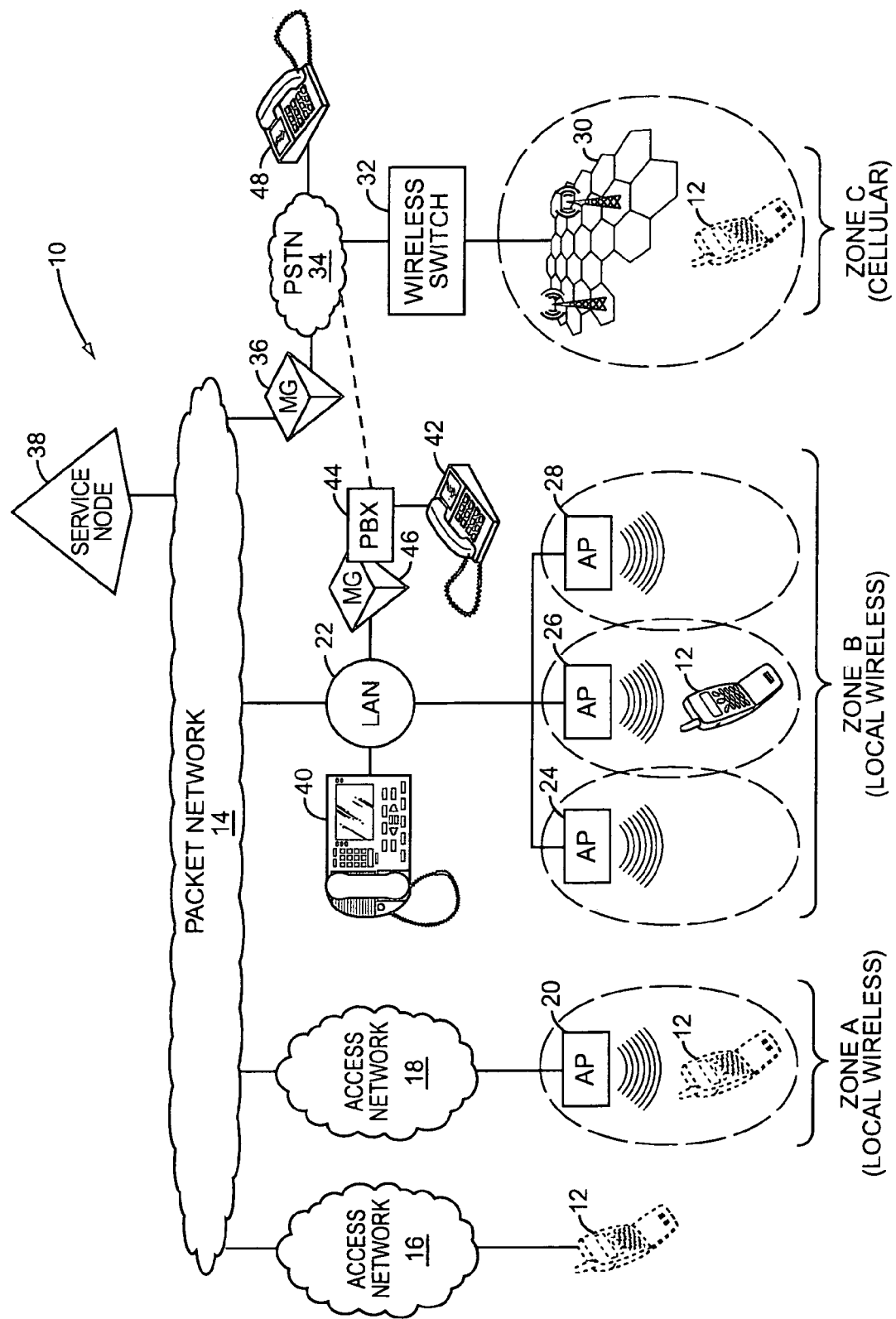
FIG. 1 is a block representation of a communication environment according to one embodiment of the present invention.

With reference to FIG. 1, a communication environment 10 is illustrated wherein a multimode telephony terminal 12 is capable of initiating communications over multiple types of communication networks using different types of communication technologies. Although not required, each of the illustrated communication networks may provide connectivity to a packet network 14. Starting at the left of FIG. 1, the telephony terminal 12 may be configured to connect directory or through a customer premise equipment (CPE), which is not shown, to an access network 16 coupled to the packet network 14. The access network 16 may take many forms, including a cable access network, digital subscriber line (DSL) network, or the like. For the access network 16, the telephony terminal 12 is connected via a wired connection, perhaps using USB-based (Universal Serial Bus) technology.

Access network 18 may take a similar form to that of access network 16, but is associated with a wireless access point (AP) 20, which is capable of providing local wireless communications with the telephony terminal 12. These local wireless communications may take many forms, including those implementing IEEE 802.11 a, b, g and n standards, Bluetooth, ultra-wideband communication standards, and the like. The wireless AP 20 will support a local wireless communication zone (Zone A), which provides a limited range of communications. The access networks 16 and 18 may be associated with residential or small business environments.

For a larger enterprise communication environment, a local area network (LAN) 22, which is coupled to the packet network 14, may support multiple wireless access points 24, 26, and 28 to provide a larger area of local wireless communications (Zone B). Preferably, the local wireless communication zones associated with each of wireless APs 24, 26, and 28 are arranged to provide contiguous coverage over a desired area.

The telephony terminal 12 may also be able to facilitate cellular communications through a network of cellular base stations 30, which are supported by a wireless switch 32 such as a mobile switching center. The wireless switch 32 may be coupled to the Public Switched Telephone Network (PSTN) 34, directly or indirectly. Further, the PSTN 34, as well as the cellular network, may be connected directly or indirectly to the packet network 14 via a media gateway (MG) 36, which will facilitate the interworking of communications between the packet network 14 and the PSTN 34 by providing the proper conversions between packet-based and circuit-switched communications. The packet network 14 may also support a service node 38, which may be used by the telephony terminal 12 to facilitate communication sessions involving a packet session, wherein the service node 38 will act as a proxy for the telephony terminal 12 or otherwise facilitate signaling to initiate the call. Accordingly, the telephony terminal 12 may access various types of networks using various communication technologies to facilitate communications.

Depending on the network supporting communications for the telephony terminal 12, calls to a terminating party may require different addresses or different formats of a given address. An address is defined as any type of address used to facilitate calls over circuit-switched or packet-based communication networks. Accordingly, an address may include any variation of an E.164 directory number, URL, or network, device, or user address on a packet network. For purposes of illustration, various terminating devices are provided with different types of associated addresses. For example, a voice over packet (VoP) terminal 40 is coupled to the LAN 22 and is associated with a directory number 6-392-2218, as well as a Session Initiation Protocol (SIP) URL, tom@acme.com. The enterprise environment may also include a more traditional telephone 42, which is supported by the enterprise's Private Branch Exchange (PBX) 44, coupled to the LAN 22 via a media gateway 46. Again, the media gateway 46 will provide the necessary conversions between circuit-switched and packet-based communications. The telephone 42 is associated with a public directory number of 819-562-5834, an internal directory number 392-5834, and a basic extension of 5834. When dialing telephone 42 from outside of the enterprise, local calls will be directed to 562-5834, wherein long distance calls will use the full 10-digit directory number preceded by a 1 to initiate a long distance call. Within certain parts of the enterprise, only the extension need be dialed. For other areas within the enterprise, the internal directory number must be preceded by a 6. Another telephone 48 is illustrated as being directly supported by the PSTN 34, and is associated with a directory number 613-712-3456. As illustrated, terminating devices may be associated with different addresses, and the addresses to use to initiate calls to the terminating devices may need to be modified based on where the call to the terminating device is originated.

The present invention allows the telephony terminal 12 to determine an address to use for initiating a call to a terminating party based on the current network connectivity of the telephony terminal 12. The network connectivity of the telephony terminal 12 is the type of network supporting communications with the telephony terminal 12, the communication technology used to support communications, or a combination thereof. In essence, the telephony terminal 12 will either select an appropriate address or modify an address as necessary to initiate a call to the terminating party based on the current network connectivity, so that the caller does not have to select or otherwise modify the address to initiate a call. In one embodiment, the telephony terminal 12 will include contact information for the terminating party, and the contact information will include multiple addresses at which the terminating party can be reached, or at least one address that can be used or modified to initiate the call. Thus, the caller may simply select the terminating party, and perhaps the device or location to initiate the call. The telephony terminal 12 will then initiate the call using the appropriate address or address format.

The contact information may include information in an address book, received call logs, or sent call logs. Those skilled in the art will recognize other ways in which contact information may be received, stored, or otherwise used in the telephony terminal 12. The telephony terminal 12 will either select or process the address information associated with the contact information to initiate calls based on network connectivity.

Figure 2B:
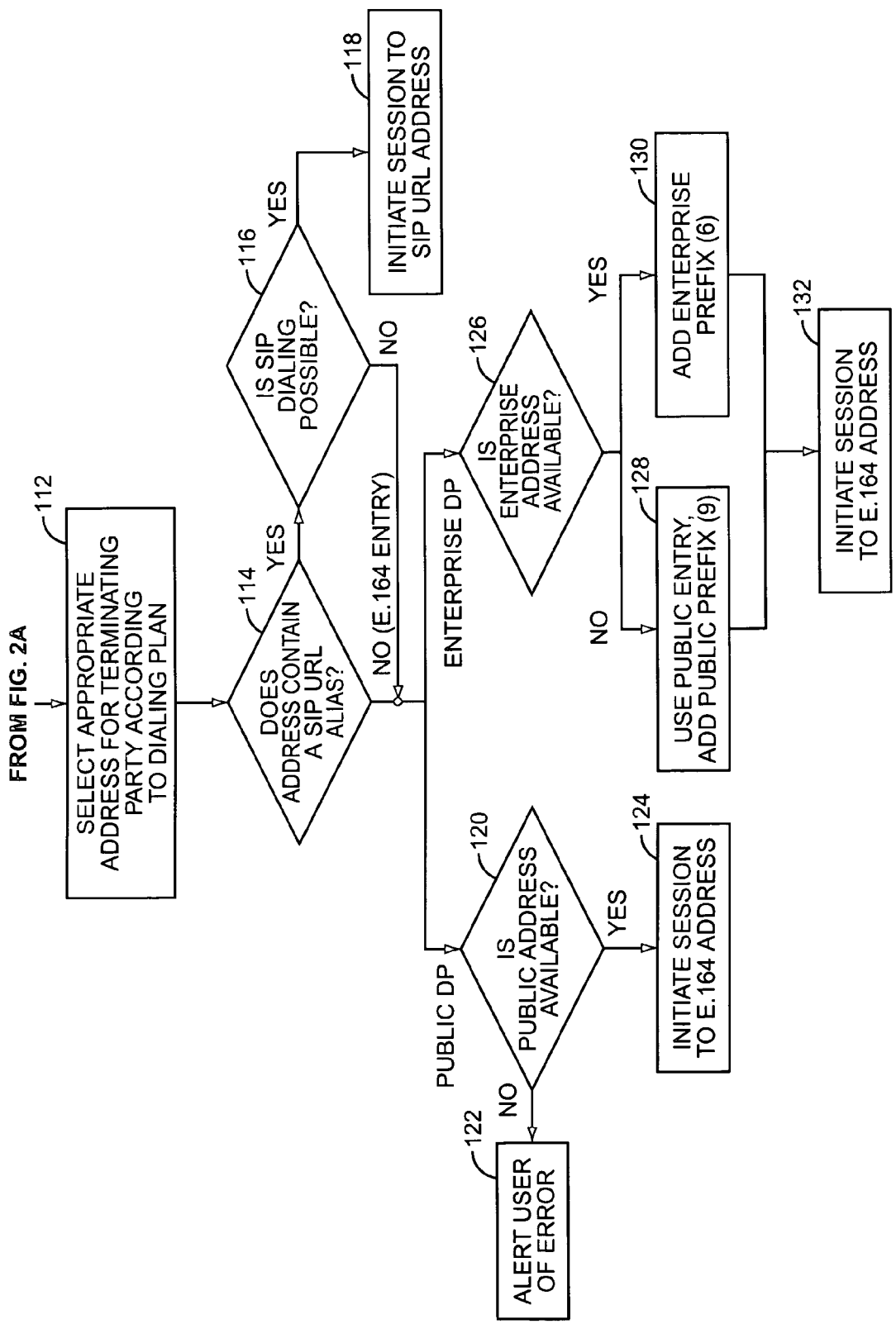

Turning now to FIGS. 2A and 2B, an exemplary flow diagram is provided to illustrate operation of the present invention according to one embodiment. In this example, the telephony user associated with telephony device 12 may have multiple identifications (IDs), which correspond to different roles for communication. In this example, the telephony user is referred to as an originating user, and is associated with a business ID and a personal ID. These IDs may have an impact on the particular address to use to initiate the call or the dialing plan, which defines a format, for the address when used to initiate the call. Initially, the telephony device 12 will receive user input to select an originating ID, if multiple IDs are available (step 100). Alternatively, the telephony device 12 may be configured to always use the previously selected originating ID until instructed otherwise by the user. When the originating user wants to initiate a call, the telephony device 12 will receive user input to select the terminating party (step 102). The telephony device 12 may provide the originating party with a list of available terminating parties as illustrated in FIG. 2C. Once the telephony terminal 12 identifies the terminating party, it may receive user input to select an address type, if available, for the selected terminating party (step 104). The address type may correspond to the particular terminating device for the terminating party, or a general location. FIG. 2D illustrates an exemplary display provided to the originating party for selecting an address type for a selected terminating party. In this example, the selected terminating party is Tom Jones and the address type is the office for Tom Jones.

Next, the telephony terminal 12 will determine the current network connectivity, which again corresponds to the communication network facilitating communications with the telephony terminal 12 or the corresponding communication technology (step 106). The telephony terminal 12 will then determine the originating ID, which was provided by the user (step 108), and select an appropriate dialing plan based on the current network connectivity and the originating ID, if available (step 110). FIG. 2E illustrates various dialing plan definitions for the different originating IDs. The dialing plan dictates the formatting for the address used to initiate the call. For example, the public dialing plans will use the publicly available directory numbers, if applicable, for dialing the terminating party. The enterprise dialing plan may modify the address or may select a particular address for internal dialing. The enterprise dialing plan may also define a requisite prefix to access a line prior to dialing an internal directory number or extension.

Once a dialing plan is selected, the telephony terminal 12 will select an address for the terminating party according to the dialing plan (step 112). Depending on the configuration, the address may be selected and then modified according to the dialing plan, or may merely be selected from a list of addresses corresponding to each available dialing plan. Notably, there may not be a need to select a particular dialing plan, if the potential addresses already reflect the requisite dialing patterns or formats. FIG. 2F illustrates different dialing plans for the office of Tom Jones, depending on whether the originating party is initiating the call from a public network or an enterprise network supporting both the originating and terminating parties. In this example, assume the enterprise dialing plan is selected, and that Tom Jones has multiple addresses associated with the enterprise office address: 392-4578 (an internal directory number), and a SIP URL of tjones@acme.com. When multiple addresses are available, the telephony terminal 12 may be configured to default to one of the two addresses and then try the other address or addresses if the attempt to initiate the call fails.

Thus, the telephony terminal 12 may determine if the selected addresses contains a SIP URL alias (step 114). If a SIP URL is available, the telephony terminal 12 may determine if SIP-based dialing is possible (step 116). If SIP-based dialing is possible, the telephony terminal may initiate the session using the SIP URL address (step 118). If SIP dialing is not possible (step 116), the telephony terminal 12 may use the E.164 directory number associated with the internal enterprise location. If SIP dialing is not possible or the selected address does not contain a SIP URL, the telephony terminal 12 may take different actions depending on whether a public or enterprise dialing plan is appropriate.

For a public dialing plan, the telephony terminal 12 will determine if a public address is available (step 120). If a public address is not available, the user may be alerted to the error (step 122). If the public address is available, the telephony terminal 12 may initiate the call to the E.164 address (step 124).

For enterprise dialing plans, the telephony terminal 12 may determine if the enterprise address is available (step 126). If the enterprise address is not available, the telephony terminal 12 may select a public address for the terminating party and add any necessary public prefix to initiate an outside call, such as dialing 9 then the public directory number (step 128). If an enterprise address is available, any enterprise prefix may be added (step 130) and the call may be initiated using the internal E.164 address and the requisite prefix (step 132).

Within this disclosure, the term "call" is used in a broad sense, and represents any type of communication initiated by the telephony terminal 12 to the terminating party. These may include traditional telephony calls, voice over packet calls, and other communication sessions involving synchronous or asynchronous communications.

In operation, the telephony terminal 12 will automatically determine an address by selecting an address from a list or modifying an address for a terminating party based on the network connectivity for the telephony terminal 12. The network connectivity may be cellular, local wireless, PSTN, or LAN based. The network connectivity may be generalized to a specific type of network, or may be made specific to a particular access point, such as the local wireless access points 20, 24, 26, and 28. Determining the address may be accomplished by specifying a name for the terminating party as entered by the originating user via a keyboard or voice command, or as selected from a menu. Alternatively, the terminating party may be determined by the originating user selecting an entry from a call log on the telephony terminal 12, stored on a remote database, or provided through another entity, such as the service node 38.

When determining the address involves selecting one of many available addresses for the terminating party, the addresses may take many forms and can be associated with different telephony devices or locations as well as different formats for addressing one telephony device. Accordingly, the address can be a public E.164 address, a private E.164 address, an international E.164 address, an abbreviated dialing E.164 address, a SIP address, or a URL address, just to name a few of the potential types of addresses. When determining the address includes modifying an address based on the network connectivity, such modifications may include adding a prefix, removing a prefix, substituting a portion of the address, or a combination thereof, depending on the type of network and communication technology used to facilitate communications. As noted, if the telephony terminal 12 can support multiple originating IDs or roles, the address selection can also be based on a selected or active originating ID or role.

The basic architecture of the telephony terminal 12 is represented in FIG. 3 and may include a receiver front end 50, a radio frequency transmitter section 52, an antenna 54, a duplexer or switch 56, a baseband processor 58, a control system 60, a frequency synthesizer 62, and a user (originating party) interface 64. The receiver front end 50 receives information bearing radio frequency signals from one or more remote transmitters provided by a base station. A low noise amplifier 66 amplifies the signal. A filter circuit 68 minimizes broadband interference in the received signal, while down-conversion and digitization circuitry 70 downconverts the filtered, received signal to an intermediate or baseband frequency signal, which is then digitized into one or more digital streams. The receiver front end 50 typically uses one or more mixing frequencies generated by the frequency synthesizer 62. The baseband processor 58 processes the digitized received signal to extract the information or data bits conveyed in the received signal. This processing typically comprises demodulation, decoding, and error correction operations. As such, the baseband processor 58 is generally implemented in one or more digital signal processors (DSPs).

On the transmit side, the baseband processor 58 receives digitized data, which may represent voice, data, or control information, from the control system 60, which it encodes for transmission. The encoded data is output to the transmitter 52, where it is used by a modulator 72 to modulate a carrier signal that is at a desired transmit frequency. Power amplifier circuitry 74 amplifies the modulated carrier signal to a level appropriate for transmission, and delivers the amplified and modulated carrier signal to the antenna 54 through the duplexer or switch 56. The control system 60 will operate to provide the functions described above that embody the concepts of the invention. The control system 60 may be integrated or distributed among different processing circuitry.

As noted above, the telephony terminal 12 may be able to communicate with the wireless access points 20, 24, 26, and 28 as well as with the cellular network. Accordingly, the receiver front end 50, baseband processor 58, and radio frequency transmitter section 52 cooperate to provide either a wireless interface for the cellular network or the local wireless interface for the wireless access points 20, 24, 26, and 28. These functions may be implemented using redundant circuitry, or by configuring common circuitry to operate in different modes. The configuration of the telephony terminal 12 will be dictated by economics and designer choice.

A user may interact with the telephony terminal 12 via the interface 64, which may include interface circuitry 76 associated with a microphone 78, a speaker 80, a keypad 82, and a display 84. The interface circuitry 76 typically includes analog-to-digital converters, digital-to-analog converters, amplifiers, and the like. Additionally, it may include a voice encoder/decoder, in which case it may communicate directly with the baseband processor 58. The microphone 78 will typically convert audio input, such as the user's voice, into an electrical signal, which is then digitized and passed directly or indirectly to the baseband processor 58. Audio information encoded in the received signal is recovered by the baseband processor 58, and converted by the interface circuitry 76 into an analog signal suitable for driving the speaker 80. The keypad 82 and display 84 enable the user to interact with the telephony terminal 12, input numbers to be dialed; access and select addresses, dialing plans, originating party IDs; select from a number of available networks to use for communications, as well as provide traditional control of the telephony terminal 12.

In addition to or in lieu of the local wireless and cellular interfaces, the telephony terminal 12 may have other communication interfaces, such as the wired network interface 86, to facilitate communications over other types of networks using various communication technologies. Those skilled in the art will recognize the numerous types of communication interfaces available for the present invention. For additional information, please see U.S. application Ser. No. 10/409,280 filed Apr. 8, 2003 entitled INTEGRATED WIRELINE AND WIRELESS SERVICE, U.S. application Ser. No. 10/409,290 filed Apr. 8, 2003 entitled CALL TRANSFER FOR AN INTEGRATED WIRELINE AND WIRELESS SERVICE, U.S. application Ser. No. 10/693,540 filed Oct. 24, 2003 entitled CALL TRANSFER FOR AN INTEGRATED WIRELINE AND WIRELESS SERVICE USING A TEMPORARY DIRECTORY NUMBER, U.S. application Ser. No. 10/693,539 filed Oct. 24, 2003 entitled CALL TRANSFER FOR AN INTEGRATED WIRELINE AND WIRELESS SERVICE USING A TEMPORARY DIRECTORY NUMBER, and U.S. application Ser. No. 10/784,743 filed Feb. 23, 2004 entitled CALL TRANSFER FOR AN INTEGRATED WIRELINE AND WIRELESS SERVICE, the disclosures of which are incorporated herein by reference in their entireties.

Those skilled in the art will recognize improvements and modifications to the preferred embodiments of the present invention. All such improvements and modifications are considered within the scope of the concepts disclosed herein and the claims that follow.

What is claimed is:

1. A terminal comprising:
   a) at least one communication interface providing network connectivity to at least one communication network; and
   b) a control system associated with the at least one communication interface and adapted to:
      i) determine a terminating address for a terminating party based on current network connectivity to the at least one communication network; and
      ii) initiate communications with the terminating party using the terminating address.

2. The terminal of claim 1 wherein a plurality of addresses corresponding to different types of network connectivity are associated with the terminating party, such that different ones of the plurality of addresses correspond to different ones of the types of network connectivity, and to determine the terminating address the control system is further adapted to:
   a) determine the current network connectivity available for the communications with the terminating party; and
   b) select the terminating address from the plurality of addresses based on the current network connectivity.

3. The terminal of claim 2 wherein at least two of the plurality of addresses are of the group consisting of a public E.164 address, private E.164 address, international E.164 address, abbreviated dialing E.164 address, packet network address, uniform resource locator address, and session initiation protocol address.

4. The terminal of claim 1 wherein different formats of the terminating address correspond to different types of network connectivity, and to determine the terminating address, the control system is further adapted to:
   a) determine the network connectivity to use for the communications with the terminating party; and
   b) provide a select format of the terminating address from the different formats based on the network connectivity, wherein the select format of the terminating address is used to initiate the communications with the terminating party.

5. The terminal of claim 4 wherein to provide the select format of the terminating address, the control system is further adapted to modify a primary format of the terminating address to provide the select format.

6. The terminal of claim 5 wherein the primary format of the terminating address is modified by removing a prefix from the terminating address.

7. The terminal of claim 5 wherein the primary format of the terminating address is modified by adding a prefix to the terminating address.

8. The terminal of claim 5 wherein the primary format of the terminating address is modified by replacing a portion of the terminating address.

9. The terminal of claim 5 wherein the primary format of the terminating address is modified by removing a portion of the terminating address.

10. The terminal of claim 5 wherein the primary format of the terminating address is modified by adding a portion to the terminating address.

11. The terminal of claim 1 wherein the at least one communication interface is adapted to facilitate a plurality of different types of network connectivity, and different terminating addresses or different terminating address formats are used to initiate communications with the terminating party, the control system further adapted to determine the network connectivity to initiate communications with the terminating party and determine the terminating address by either:
   a) selecting one of a plurality of addresses associated with the terminating party as the terminating address based on the network connectivity, or
   b) modifying an address associated with the terminating party to use as the terminating address based on the network connectivity.

12. The terminal of claim 1 further comprising a user interface associated with the control system, which is further adapted to select the terminating party based on input received from a user via the user interface.

13. The terminal of claim 12 wherein the input specifies a name of the terminating party.

14. The terminal of claim 12 wherein the input specifies a location or terminal associated with the terminating party.

15. The terminal of claim 12 wherein the input specifies the terminating party from a list of a plurality of parties.

16. The terminal of claim 12 wherein the input selects the terminating party from a call log.

17. The terminal of claim 1 wherein the control system is adapted to:
   a) support a plurality of originating IDs for a user;
   b) select one of the plurality of originating IDs to use in association with initiating the communications with the terminating party;
   c) determine the terminating address for the terminating party based on the one of the plurality of originating IDs as well as the network connectivity to the at least one communication network.

18. The terminal of claim 1 wherein the network connectivity corresponds to facilitating communications with a supporting network consisting of at least one of the group consisting of a cellular network, any local wireless network, a specific local wireless network, any local wireless access point, a specific local wireless access point, any local area network, a specific local area network, and a public switched telephone network.

19. A method comprising:
   a) determining network connectivity;
   b) determining a terminating address for a terminating party based on the network connectivity to at least one communication network; and
   c) initiating communications with the terminating party using the terminating address.

20. The method of claim 19 wherein a plurality of addresses corresponding to different types of network connectivity are associated with the terminating party, such that different ones of the plurality of addresses correspond to different ones of the types of network connectivity, and to determine the terminating address, the method further comprising selecting the terminating address from the plurality of addresses based on the network connectivity.

21. The method of claim 20 wherein at least two of the plurality of addresses are of the group consisting of a public E.164 address, private E.164 address, international E.164 address, abbreviated dialing E.164 address, packet network address, uniform resource locator address, and session initiation protocol address.

22. The method of claim 19 wherein different formats of the terminating address corresponding to different types of network connectivity, and to determine the terminating address, the method further comprises providing a select format of the terminating address from the different formats based on the network connectivity, wherein the select format of the terminating address is used to initiate communications with the terminating party.

23. The method of claim 22 wherein to provide the select format of the terminating address, the method further comprises modifying a primary format of the terminating address to provide the select format.

24. The method of claim 23 wherein the primary format of the terminating address is modified by removing a prefix from the terminating address.

25. The method of claim 23 wherein the primary format of the terminating address is modified by adding a prefix to the terminating address.

26. The method of claim 23 wherein the primary format of the terminating address is modified by replacing a portion of the terminating address.

27. The method of claim 23 wherein the primary format of the terminating address is modified by removing a portion of the terminating address.

28. The method of claim 23 wherein the primary format of the terminating address is modified by adding a portion to the terminating address.

29. The method of claim 19 wherein a plurality of different types of network connectivity are possible, and different terminating addresses or different terminating address formats are used to initiate communications to the terminating party, the method further comprising determining the terminating address by either:
   a) selecting one of a plurality of addresses associated with the terminating party as the terminating address based on the network connectivity, or
   b) modifying an address associated with the terminating party to use as the terminating address based on the network connectivity.

30. The method of claim 19 further comprising selecting the terminating party based on input received from a user via a user interface.

31. The method of claim 30 wherein the input specifies a name of the terminating party.

32. The method of claim 30 wherein the input specifies a location or terminal associated with the terminating party.

33. The method of claim 30 wherein the input specifies the terminating party from a list of a plurality of parties.

34. The method of claim 30 wherein the input selects the terminating party from a call log.

35. The method of claim 19 wherein the method further comprises:
   a) supporting a plurality of originating IDs for a user;

b) selecting one of the plurality of originating IDs to use in association with initiating the communications with the terminating party;

c) determining the terminating address for the terminating party based on the one of the plurality of originating IDs as well as the network connectivity to the at least one communication network.

36. The method of claim 19 wherein the network connectivity corresponds to facilitating communications with a supporting network consisting of at least one of the group consisting of a cellular network, any local wireless network, a specific local wireless network, any local wireless access point, a specific local wireless access point, any local area network, a specific local area network, and a public switched telephone network.

* * * * *